US007773237B2

(12) United States Patent
Takeuchi

(10) Patent No.: US 7,773,237 B2
(45) Date of Patent: Aug. 10, 2010

(54) IMAGE FORMING APPARATUS, IMAGE FORMING METHOD AND IMAGE FORMING SYSTEM

(75) Inventor: Kazuya Takeuchi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 840 days.

(21) Appl. No.: 11/677,761

(22) Filed: Feb. 22, 2007

(65) Prior Publication Data

US 2008/0205933 A1 Aug. 28, 2008

(51) Int. Cl.
*G06F 3/12* (2006.01)

(52) U.S. Cl. ........................ 358/1.1; 358/1.15; 358/1.6; 358/1.16; 399/1; 399/75; 399/151; 715/234

(58) Field of Classification Search ................. 358/1.1, 358/1.6, 1.13, 1.15, 1.16; 399/1, 75, 151; 715/234
See application file for complete search history.

(56) References Cited

U.S. PATENT DOCUMENTS 6,092,088 A * 7/2000 Takeda ....................... 715/234
2006/0092459 A1 * 5/2006 Kimura et al. ............ 358/1.15
2006/0132866 A1 * 6/2006 Okamoto .................. 358/1.15

FOREIGN PATENT DOCUMENTS

JP 2004-320255 11/2004

* cited by examiner

*Primary Examiner*—Kimberly A Williams
(74) *Attorney, Agent, or Firm*—Turocy & Watson, LLP

(57) ABSTRACT

An image forming apparatus includes a communicating unit (123) that performs communication with an external apparatus (200), a recording unit (97) that stores image information, an image processing unit (96) that performs image processing, and a control unit (91) that performs control to secure the image processing unit from the external apparatus via the communicating unit, when a request signal for performing processing of the image information is received, if the image processing unit can be secured, convert a file format by expanding the image information and compressing the image information again using the image processing unit secured and transfer the image information converted via the communicating unit, and, if the image processing unit cannot be secured, transmit an indication that the image processing unit cannot be secured and the image information before the conversion to the external apparatus via the communicating unit.

20 Claims, 5 Drawing Sheets

IMAGE FORMING APPARATUS, IMAGE FORMING METHOD AND IMAGE FORMING SYSTEM

BACKGROUND OF THE INVENTION

Recently, according to the improvement of performance of image forming apparatuses such as a digital copying machine, an integrated digital apparatus having not only a copying function but also a function of a printer is developed and spread. Such image forming apparatuses have a full network function and can perform various kinds of image processing using a client computer via a network.

A Patent Document 1 (JP-A-2004-320255) discloses an image processing apparatus to which a computer capable of executing image processing corresponding to an image processing command is connected. In the Patent Document 1, addition of an image processing command is permitted according to a file format at a conversion destination of read image data to distribute processing loads to the image processing apparatus.

However, in this Patent Document 1, since load distribution processing is performed only in the inside of the image processing apparatus by the addition of the command corresponding to the file format, there is a problem in that, for example, the processing is delayed when an image processing unit built in the image processing apparatus is in use.

BRIEF SUMMARY OF THE INVENTION

An embodiment of an image forming apparatus according to the invention is an image forming apparatus including: a communicating unit (123) that performs communication with an external apparatus (200); a recording unit (97) that stores image information; an image processing unit (96) that performs image processing; and a control unit (91) that performs control to secure the image processing unit from the external apparatus via the communicating unit, when a request signal for performing processing of the image information is received, if the image processing unit can be secured, converts a file format by expanding the image information and compressing the image information again using the image processing unit secured and transfers the image information converted via the communicating unit, and, if the image processing unit cannot be secured, transmits an indication that the image processing unit cannot be secured and the image information before the conversion to the external apparatus via the communicating unit.

DETAILED DESCRIPTION OF THE INVENTION

File conversion processing by an image forming apparatus and an information processing apparatus according to the invention will be hereinafter explained in detail using the drawings.

<Image Forming Apparatus According to the Invention>

(Mechanical Structure)

Figure 1:
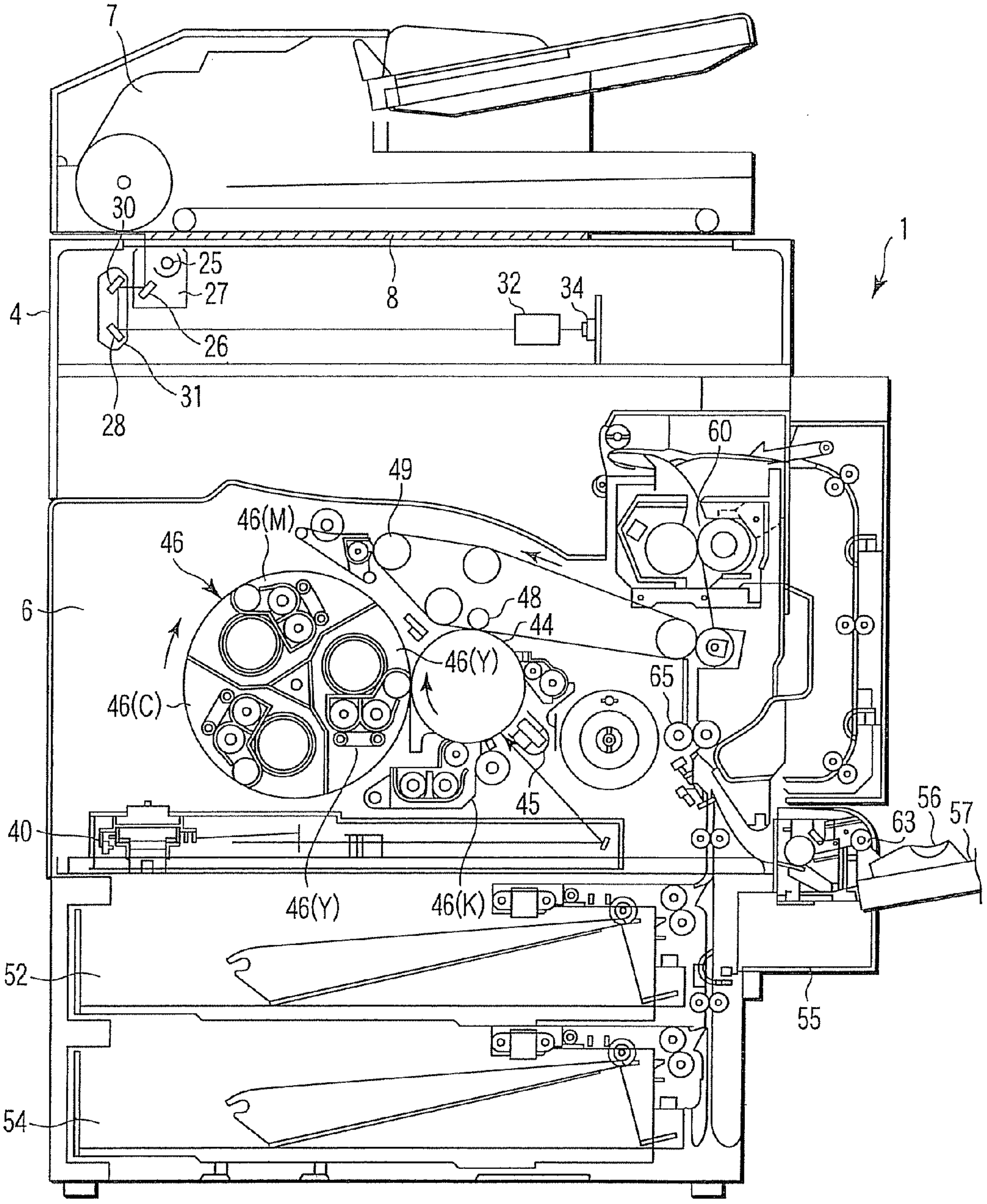
FIG. 1 is a diagram for explaining an example of an internal structure of an image forming apparatus according to the invention.

First, an example of a structure of an image forming apparatus according to the invention will be explained. FIG. 1 is a diagram for explaining an internal structure of the image forming apparatus. This image forming apparatus 1 includes a color scanner unit 4 as an image scanning unit, a printer unit 6, an auto document feeder (hereinafter abbreviated as ADF) 7, and an operation panel 80 described later.

The scanner unit 4 has the ADF 7 thereon and includes an original placing stand 8 that is disposed to be opposed to the ADF 7 in a closed state and formed by transparent glass on which an original is set. Below the original placing stand 8, an exposure lamp 25 that illuminates the original placed on the original placing stand 8 and a first mirror 26 that condenses light from the exposure lamp 25 on the original and bends reflected light from the original, for example, in a left direction with respect to the drawing are fixed to a first carriage 27.

The first carriage 27 is arranged to be movable parallel to the original placing stand 8 and reciprocatingly moved below the original placing stand 8 by a not-shown scanning motor via a not-shown toothed belt and the like.

Further, below the original placing stand 8, a second carriage 28 movable parallel to the original placing stand 8 is disposed. Second and third mirrors 30 and 31 that deflect reflected light from the original, which is deflected by the first mirror 26, in order are attached to the second carriage 28 at a right angle to each other. The second carriage 28 is driven to follow the first carriage 27 by the toothed belt and the like that drive the first carriage 27 and is moved at speed half of that of the first carriage 27 in parallel to the original placing stand 8.

Moreover, below the original placing stand 8, a focusing lens 32 that focuses reflected light from a third mirror 31 on the second carriage 28 and a CCD (a photoelectric conversion element) 34 that receives and photoelectrically converts the reflected light focused by the focusing lens are disposed. The focusing lens 32 is disposed to be movable via a driving mechanism in a plane including an optical axis of the light deflected by the third mirror 31 and focuses the reflected light at a predetermined magnification by moving itself. The CCD 34 photoelectrically converts the reflected light made incident thereon and outputs an electric signal corresponding to the original read.

On the other hand, the printer unit 6 includes a laser exposure device 40 that acts as latent image forming means. The laser exposure device 40 includes a semiconductor laser as a light source, a polygon mirror as a scanning member that continuously deflects a laser beam emitted from the semiconductor laser, a polygon motor as a scanning motor that drives to rotate the polygon mirror at a predetermined number of revolutions, and an optical system that deflects the laser beam from the polygon mirror and leads the laser beam to a photoconductive drum 44 described later.

The printer unit 6 has a rotatable photoconductive drum 44 as an image bearing member disposed in substantially the center of an apparatus main body. The peripheral surface of the photoconductive drum 44 is exposed by the laser beam from the laser exposure device 40 and a desired electrostatic latent image is formed thereon. Around the photoconductive drum 44, an electrifying charger 45 that charges the drum peripheral surface to a predetermined charge, a developing device unit 46 that supplies a toner as a developing agent to the electrostatic latent image formed on the peripheral surface of the photoconductive drum 44 and develops the electrostatic latent image at a desired image density, and a transfer charger 48 that transfers a toner image formed on the photoconductive drum 44 onto a sheet are arranged.

In a lower part in the apparatus main body, an upper cassette 52 and a lower cassette 54, which can be drawn out from the apparatus main body, respectively, are disposed in a state in which the upper cassette 52 is provided on the lower cassette 54. A large capacity feeder 55 is provided beside these cassettes. Above the large capacity feeder 55, a sheet feeding cassette 57 also functioning as a manual feed tray 56 is detachably mounted.

A registration roller pair 65 is provided on an upstream side of the photoconductive drum 44. The registration roller pair 65 corrects inclination of a copy sheet taken out, aligns the leading end of the toner image on the photoconductive drum 44 and the leading end of the copy sheet, and feeds the copy sheet to a transfer belt unit 49 at the same speed as moving speed of the peripheral surface of the photoconductive drum 44.

In a front upper part of the apparatus main body, an operation panel 80 for inputting various copying conditions, a copy start signal for starting a copying operation, and the like is provided. As shown in, for example, FIG. 2, the operation panel 80 includes a print key 82, a panel CPU 83, and a liquid crystal display unit 84. The print key 82 instructs start of copying. The liquid crystal display unit 84 displays the number of originals and the number of copies and performs display of a copying magnification and edition and various kinds of operation guidance. A touch panel is provided in this liquid crystal display unit 84.

(Electrical Structure)

Figure 2:
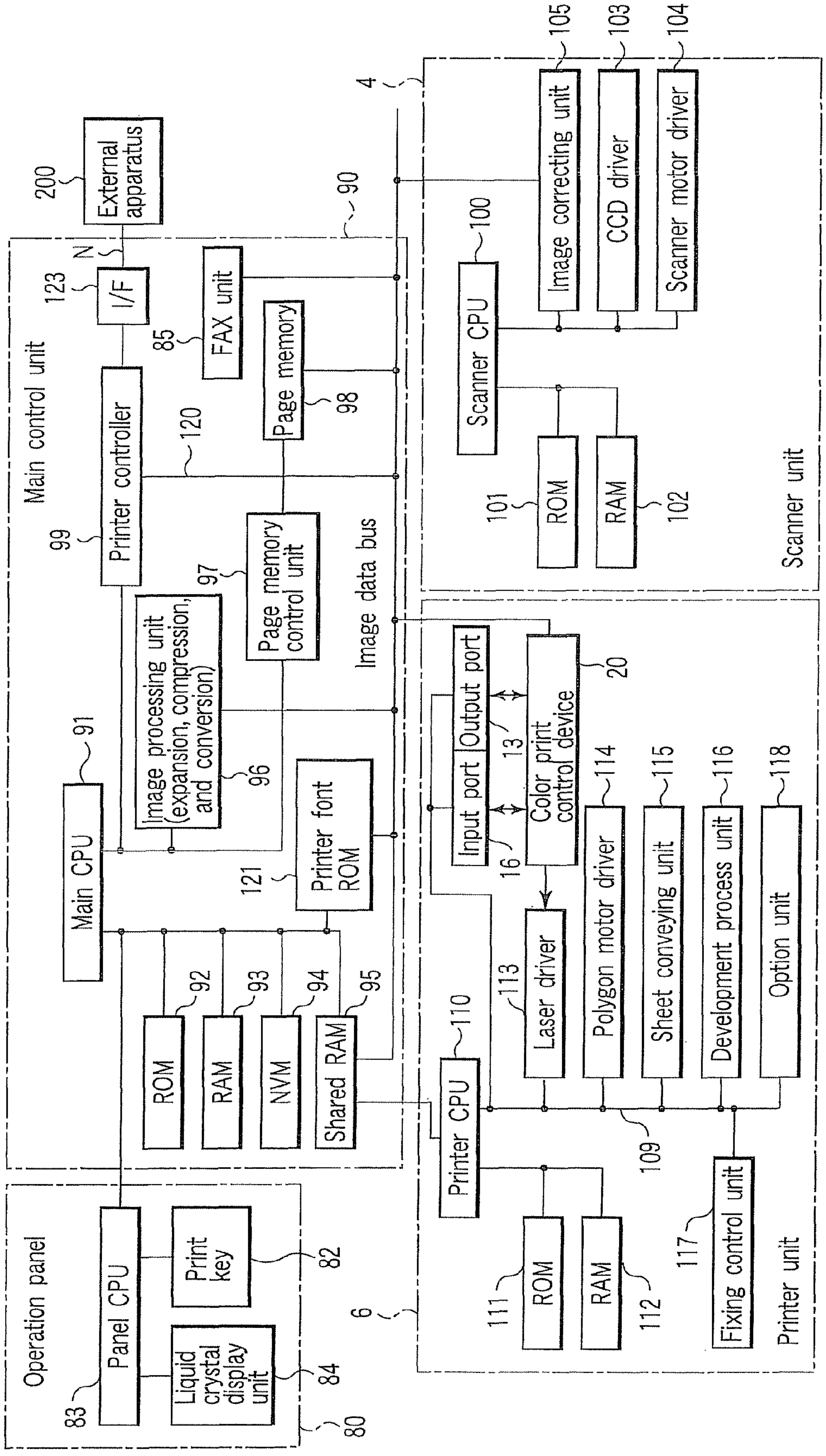
FIG. 2 is a block diagram for explaining an example of an electrical structure of the image forming apparatus according to the invention.

In a block diagram shown in FIG. 2, the image forming apparatus according to the invention includes a control unit constituted by three CPUs, namely, a main CPU (central processing unit) 91 in a main control unit 90, a scanner CPU 100 of the color scanner unit 4, and a printer CPU 110 of the color printer unit 6. The main CPU 91 performs serial communication with the printer CPU 110 and issues an operation instruction and the printer CPU 110 returns a status. The main CPU 91 performs serial communication with the scanner CPU 100 and issues an operation instruction and the scanner CPU 100 returns a status to the main CPU 91.

The operation panel 80 is connected to the main CPU 91. The main control unit 90 includes the main CPU 91, a ROM 92, a RAM 93, an NVM 94, an image processing unit 96 that performs expansion, compression, and conversion processing, a page memory control unit 97, a page memory 98, a printer controller 99, and an HDD 124.

The main CPU 91 controls the entire main control unit 90. The ROM 92 has a control program stored therein. The RAM 93 temporarily stores data.

The NVM (nonvolatile random access memory: nonvolatile RAM) 94 is a nonvolatile memory backed up by a battery (not shown). The NVM 94 holds data thereon when a power supply is turned off.

The page memory control unit 97 stores image data in the page memory 98 and reads out image data from the page memory 98. The page memory 98 has an area enough for storing image data for plural pages. The page memory 98 is formed to be capable of storing, page by page, data obtained by compressing image data from the scanner unit 4. Font data corresponding to print data is stored in a printer font ROM 121.

The printer controller 99 includes the printer font ROM 121. The printer controller 99 expands print data from an external apparatus 200 such as a personal computer into image data using font data stored in the printer font ROM 121 at resolution corresponding to data indicating resolution given to the print data via an input port 16. An external interface 123 performs communication of various signals with the external apparatus 200. Image information and the like are acquired by a FAX unit 85 as a facsimile and stored by the page memory 98 and the like.

The scanner unit 4 includes the scanner CPU 100 that controls the entire scanner unit 4, a ROM 101 having a control program and the like stored therein, a RAM 102 for data storage, a CCD driver 103 that drives the CCD sensor 34, a scanner motor driver 104 that controls rotation of a motor for moving the exposure lamp 25, the mirrors 26, 30, and 31, and the like, and an image correcting unit 105 including an A/D conversion circuit for converting an analog signal from the CCD sensor 34 into a digital signal, a shading correction circuit for correcting fluctuation in a threshold level with respect to an output signal from the CCD sensor 34 due to variation in the CCD sensor 34, a change in an ambient temperature, or the like, and a line memory for temporarily storing a digital signal subjected to shading correction from the shading correction circuit.

The printer unit 6 includes the printer CPU 110 that controls the entire printer unit 6, a ROM 111 having a control program and the like stored therein, a RAM 112 for data storage, a laser driver 113 that turns on and off light emission (exposure) by a semiconductor laser, a polygon motor driver (a motor control device) 114 that controls rotation of a polygon motor of a laser unit, a sheet conveying unit 115 that controls conveyance of a sheet by a conveying path, a development process unit 116 that performs charging, development, and transfer using the electrifying charger 45, the developing device unit 46, and the transfer charger 48, a fixing control unit 117 that controls a fixing device unit 60, an option unit 118, an output port 13, the input port 16, and an image forming apparatus 20 according to the embodiment of the invention.

The image processing unit 96 that performs expansion, compression, and conversion processing and the page memory 98 are connected to transmit and receive image data. The image correcting unit 105 and the image processing unit 96 are connected to transmit and receive image data. Similarly, the image correcting unit 105 and the color print control device 20 are connected to transmit and receive image data. The printer controller 99 and the image processing unit 96 are also connected to transmit and receive image data.

<Image Forming System According to the Invention>

Figure 3:
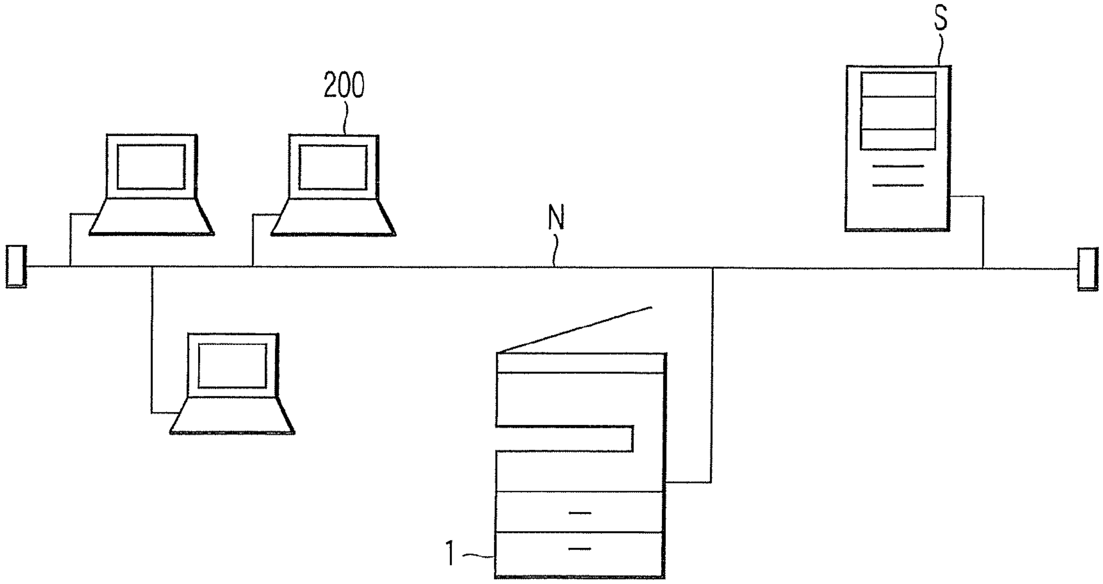
FIG. 3 is an explanatory diagram showing an example of a system through a network in which the image forming apparatus according to the invention is used.

As shown in FIG. 3, the image forming apparatus described above can perform image formation corresponding to operation by a user in cooperation with a client PC 200 and a server S via a network N such as the Ethernet (registered trademark).

(Information Processing Apparatus)

Figure 4:
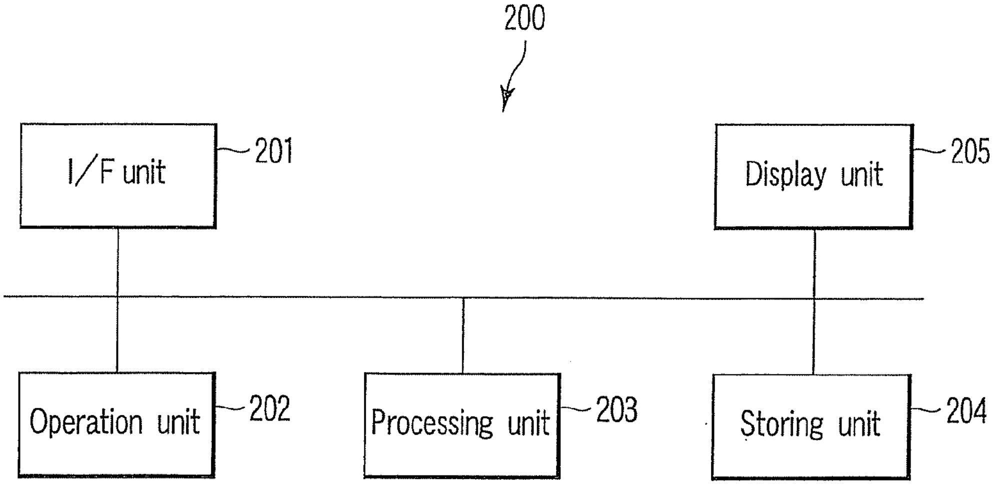
FIG. 4 is a block diagram showing an example of a structure of an information processing apparatus on the system according to the invention.

The client PC 200 or the like has, as shown in FIG. 4, an I/F unit 201 that can perform communication via the network N such as the Ethernet (registered trademark), an operation unit 202 such as a mouse and a keyboard, a processing unit 203 constituted by a CPU and the like, a storing unit 204 such as a hard disk and a detachable memory, and a display unit 205 such as a liquid crystal display.

According to an embodiment of the invention, in such an image forming system constituted by the information processing apparatus 200 and the client PC 200, the server S, and the like communicating via the network N, it is possible to perform file conversion processing described later.

<File Conversion Processing by the Image Forming Apparatus According to the Invention>

Figure 5:
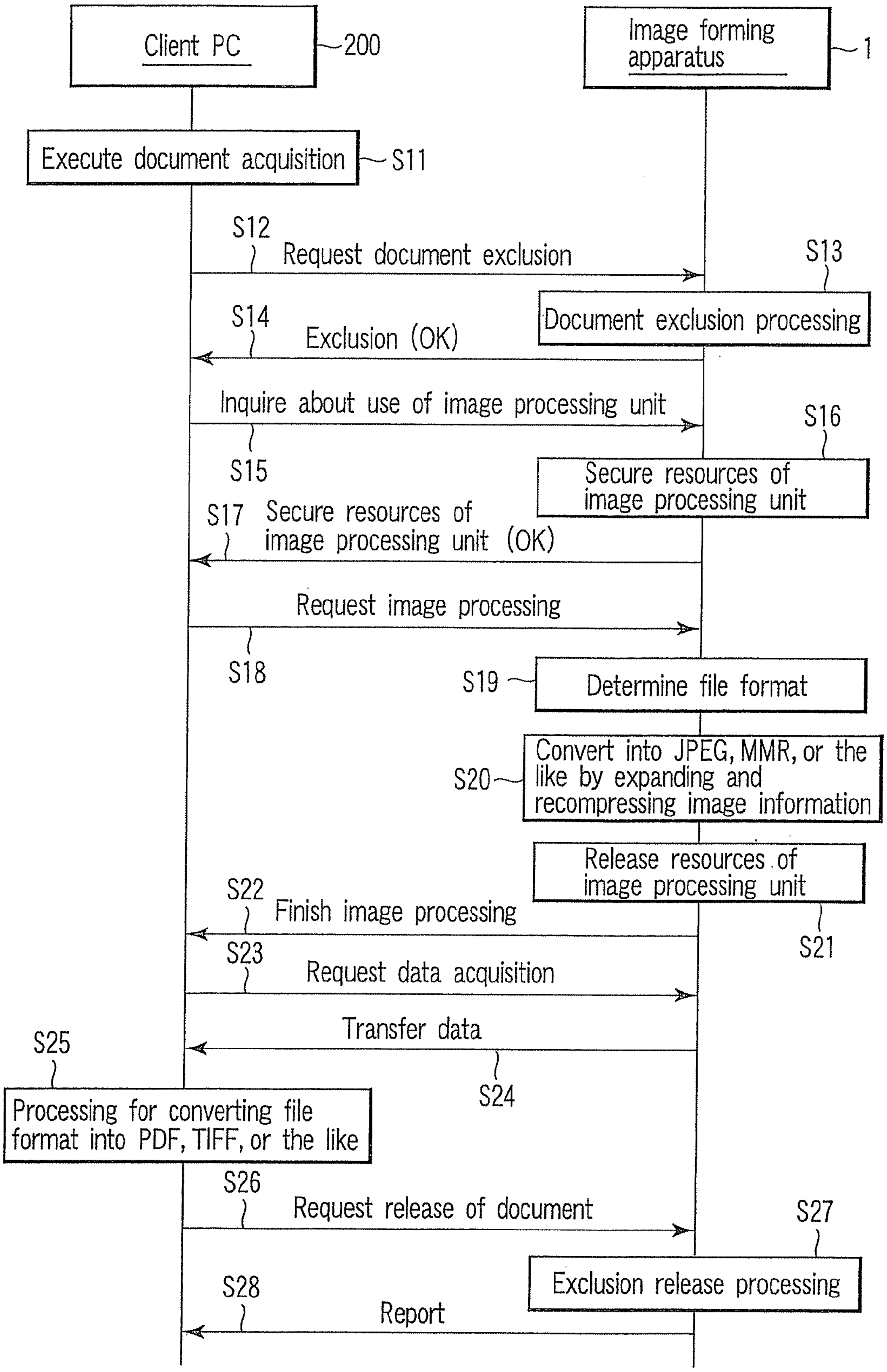
FIG. 5 is a flowchart showing an example of file conversion processing by the image forming apparatus and the information processing apparatus according to the invention.
Figure 6:
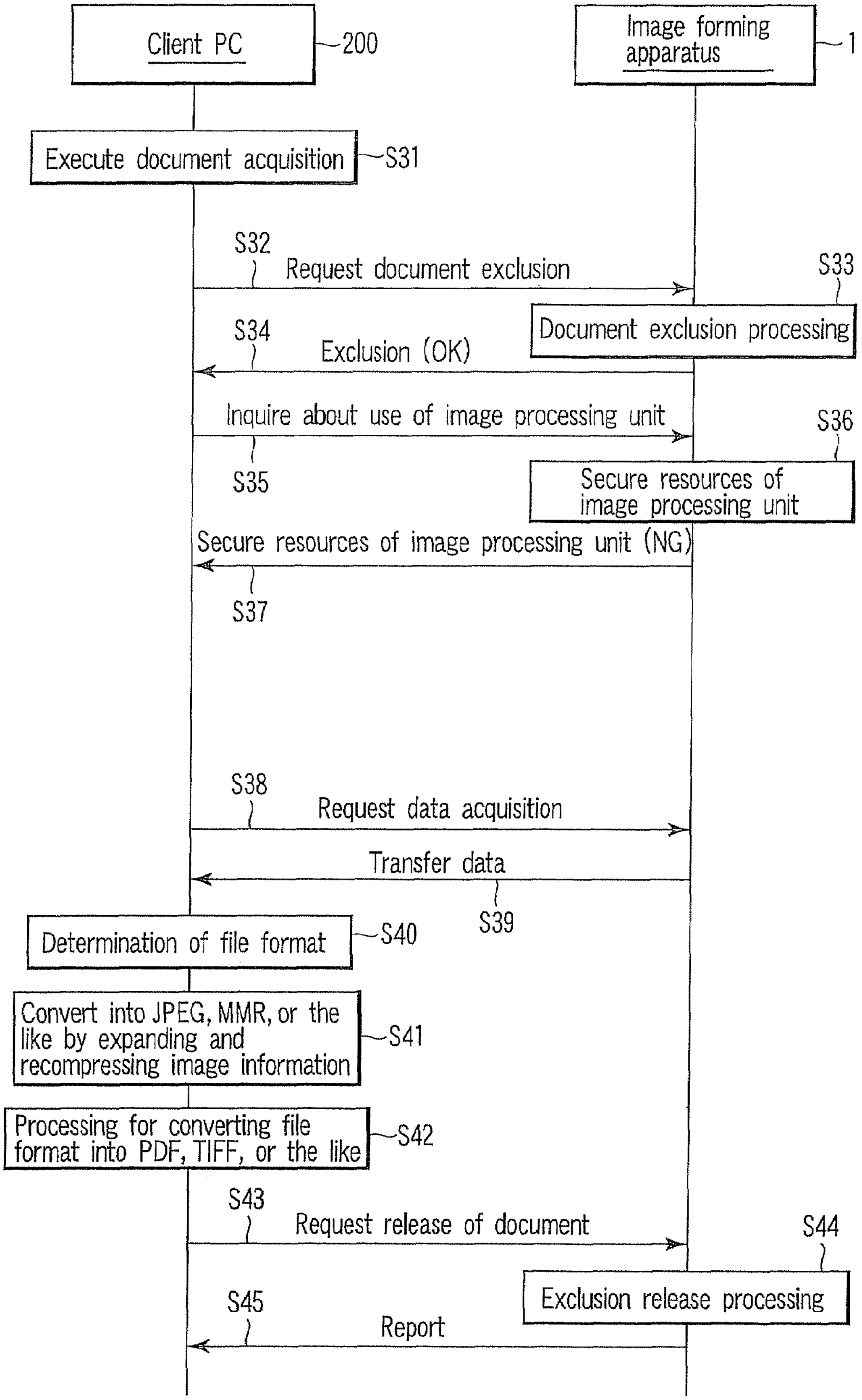
FIG. 6 is a flowchart showing another example of the file conversion processing by the image forming apparatus and the information processing apparatus according to the invention.

File conversion processing in the image forming apparatus according to the invention will be explained in detail using flowcharts in FIGS. 5 and 6.

Documents are inputted to a hard disk of the page memory 98 or the like of the image forming apparatus 1 from plural input sources in the copy operation, print operation from the client PC, scan operation, and facsimile transmission and reception operation, and the like. However, a system for storing these documents is different depending on an input source. For example, documents inputted by the copy operation and the print operation are stored in formats suitable for printing.

In an application associated with the image forming apparatus 1, image processing for converting the documents inputted from all of these input sources into a browsable format is necessary in downloading the documents to the client PC 200 and storing the documents as browsable file.

(Case in Which File Conversion Processing is Performed in the Image Forming Apparatus: FIG. 5)

First, when a document desired to be acquired among documents stored in the page memory 98 or the like of the image forming apparatus 1 is selected and a request for processing of the document is received from a user, the application of the client PC 200 associated with the image forming apparatus 1 performs conversion processing for a file format in a procedure described later (step S11).

Image Information to be Set as an Object

As image information of a document or the like stored in the page memory 98 or the like of the image forming apparatus 1, there are following types. Some image information is set as an object of conversion of a file format and other image information is not set as an object.

The image information to be set as an object of the file conversion processing is, as examples, <1> image information of a format unique to the image forming apparatus 1 scanned by the scanner unit 4 (for the purpose of plural times of printing or the like) and stored in the page memory 98 or the like to be copied, and <2> image information of a format unique to the image forming apparatus 1 transmitted from an external PC or the like (for the purpose of plural times of printing or the like) and stored in the page memory 98 or the like to be printed.

The image information not to be set as an object of the file conversion processing is, as examples, <3> image information scanned for the purpose of extraction by the scanner unit 4 of the image forming apparatus 1 and stored in the page memory 98 or the like in a file format such as JPEG or MMR, and <4> image information acquired by the FAX unit 85 of the image forming apparatus 1 through a telephone line or the like as facsimile information and stored in the page memory 98 or the like in a file format such as MMR.

The application of the client PC 200 associated with the image forming apparatus 1 sends an exclusion request to the image forming apparatus such that the document is not changed by others (step S12).

The image forming apparatus 1 performs document exclusion processing in response to this document exclusion request (step S13) and, if the document exclusion processing is possible, sends an OK response to the client PC 200 (step S14).

The client PC 200 inquires the image forming apparatus 1 whether the image processing unit 96 in the image forming apparatus 1 is usable (step S15). As a result of this inquiry, when the image processing unit 96 in the image forming apparatus 1 is usable, the client PC 200 secures resources of the image processing unit 96 of the image forming apparatus 1 (step S16). The image forming apparatus 1 returns a response indicating success in securing the resources of the image processing unit 96 to the application of the client PC 200 (step S17).

The application of the client PC 200 issues a request for image processing by the image processing unit 96 to the image forming apparatus 1 (step S18). On the other hand, the image forming apparatus 1 performs determination of a file format of the object image information (step S19).

As described above, as examples,

<1> image information of a unique format scanned and stored to be copied, and

<2> image information of a unique format transmitted from the external PC or the like and stored to be printed are set as file conversion objects.

Conversely,

<3> image information of JPEG, MMR, or the like scanned for the purpose of extraction, and <4> image information of MMR or the like acquired as facsimile information are not set as conversion objects.

When designated image information such as a document is set as an object of file conversion, the image forming apparatus expands and recompresses the designated image information and converts the image information into JPEG, MMR, or the like with the image processing unit 96 (step S20). After the image conversion is finished using the image processing unit, the image forming apparatus releases the resources of the image processing unit (step S21).

The image forming apparatus 1 returns a response indicating the finish of the image processing to the application side of the client PC 200 (step S22). The application of the client PC 200 sends a data acquisition request to the image forming apparatus 1 (step S23) and downloads the image information after the conversion of the file format into JPEG, MMR, or the like from the image forming apparatus 1 (step S24). The application of the client PC 200 browses this image information of JPEG, MMR, or the like with the display unit 205 or the like and then stores the image information in the storing unit 204 or the like in an image format of PDF, TIFF, or the like (step S25).

Thereafter, the application of the client PC 200 issues a request for releasing exclusion of the document. The image processing apparatus 1 releases the document exclusion processing (step S27). When the image processing apparatus 1 reports the release of the document exclusion processing to the application of the client PC 200, the processing ends (step S28).

(Case in which File Conversion Processing is Performed in the Client PC: FIG. 6)

A case in which file conversion is performed in the client PC because resources of the image processing unit cannot be secured in the image forming apparatus 1 will be explained.

First, when a document desired to be acquired among documents stored in the page memory 98 or the like of the image forming apparatus 1 is selected and a request for processing of the document is received from a user, the application of the client PC 200 associated with the image forming apparatus 1 performs conversion processing for a file format in a procedure described later (step S31).

The application of the client PC 200 associated with the image forming apparatus 1 sends an exclusion request to the image forming apparatus such that the document is not changed by others (step S32). The image forming apparatus 1 performs document exclusion processing in response to this document exclusion request (step S33) and, if the document exclusion processing is possible, sends an OK response to the client PC 200 (step S34).

The client PC 200 inquires the image forming apparatus 1 whether the image processing unit 96 in the image forming apparatus 1 is usable (step S35). In response to this inquiry, the image forming apparatus 1 attempts to secure resources of the image processing unit 96 of the image forming apparatus 1 (step S36). As a result, when it is impossible to secure the resources of the image processing unit 96 because, for example, the resources are in use, the image forming apparatus 1 returns an NG response indicating failure in securing of the resources of the image processing unit 96 to the application of the client PC 200 (step S37).

In response, the application of the client PC 200 requests the image forming apparatus 1 to transfer the object image information without converting the image information (step S38). In response to this request, the image forming apparatus 1 transfers the object image information to the client PC 200 without converting the object image information (step S39).

Thereafter, the application of the client PC 200 performs determination of a file format of the object image information (step S40).

As described above, as examples,

<1> image information of a unique format scanned and stored to be copied, and

<2> image information of a unique format transmitted from the external PC or the like and stored to be printed are set as file conversion objects.

Conversely,

<3> image information of JPEG, MMR, or the like scanned for the purpose of extraction, and <4> image information of MMR or the like acquired as facsimile information are not set as file conversion objects.

When designated image information is set as an object of file conversion, the application of the client PC 200 expands and recompresses the designated image information such as a document and converts the image information into JPEG, MMR, or the like with the image processing unit 96 (step S41). After browsing this image information of JPEG, MMR, or the like with the display unit 205 or the like, the application of the client PC 200 stores the image information in the storing unit 204 or the like in the image format of PDF, TIFF, or the like (step S42).

Thereafter, the application of the client PC 200 issues a request for releasing exclusion of the document (step S43). The image processing apparatus 1 releases the document exclusion processing (step S44). When the image processing apparatus 1 reports the release of the document exclusion processing to the application of the client PC 200, the processing ends (step S45).

As described above, the image processing unit 96 of the image forming apparatus 1 subjects the image information (a document, etc.) of the unique format stored in the memory unit 98 or the like of the image forming apparatus 1 to file conversion. When it is impossible to use the image processing unit 96 because, for example, the image processing unit 96 is in use, the client PC 200 automatically performs file conversion. In this way, the image forming apparatus 1 or the client PC 200 is used according to a state of use to perform processing. According to such a load distributing function in the MFP and the PC, it is possible to surely browse image information desired to be browsed without being affected by the state of use.

According to the various embodiments described above, those skilled in the art can realize the invention. However, various modifications of these embodiments will readily occur to those skilled in the art. It is possible to apply the embodiments to various embodiments without any inventive ability. Therefore, the invention extends over a wide range not contradicting the disclosed principles and new characteristics and is not limited to the embodiments described above.

What is claimed is:

1. An image forming apparatus comprising:

a communicating unit configured to perform communication with an external apparatus;

a recording unit configured to store image information;

an image processing unit configured to perform image processing; and a control unit configured to perform control to secure the image processing unit from the external apparatus via the communicating unit, when a request signal for performing processing of the image information is received, if the image processing unit can be secured, convert a file format by expanding the image information and compressing the image information again using the image processing unit secured and transfer the image information converted via the communicating unit, and, if the image processing unit cannot be secured, transmit an indication that the image processing unit cannot be secured and the image information before the conversion to the external apparatus via the communicating unit.

2. An image forming apparatus according to claim 1, further comprising:

a scanner unit configured to scan image information of an original; and an image forming unit configured to perform image formation on a recording medium on the basis of the image information of the original scanned by the scanner unit, wherein the control unit converts, concerning image information stored in the recording unit after being scanned by the scanner unit to form an image in the image forming unit, when a request signal for performing processing of the image information is received from the external apparatus, a file format by expanding the image information and compressing the image information again using the image processing unit.

3. An image forming apparatus according to claim 1, further comprising: an image forming unit configured to perform image formation on a recording medium on the basis of image information given, wherein the control unit converts, concerning image information given from another apparatus to form an image in the image forming unit, when a request signal for performing processing of the image information is received from the external apparatus, a file format by expanding the image information and compressing the image information again using the image processing unit.

4. An image forming apparatus according to claim 1, wherein the image processing unit performs control to convert at least one file format of JPEG and MMR by expanding the image information and compressing the image information again.

5. An image forming apparatus according to claim 1, wherein the control unit determines a file format of the image information and then expands the image information and compresses the image information again on the basis of a result of the determination.

6. An image forming apparatus according to claim 1, wherein the control unit determines a file format of the image information and, if the image information is in at least one file format of JPEG and MMR, does not perform conversion processing.

7. An image forming system comprising:

an image processing apparatus provided on a network; and an image forming apparatus including: a communicating unit configured to perform communication with the image processing apparatus via the network; a recording unit configured to store image information; an image processing unit configured to perform image processing; and a control unit configured to perform control to secure the image processing unit from the image processing apparatus via the communicating unit, when a request signal for performing processing of the image information is received, if the image processing unit can be secured, convert a file format by expanding the image information and compressing the image information again using the image processing unit secured and transfer the image information converted via the communicating unit, and, if the image processing unit cannot be secured, transmit an indication that the image processing unit cannot be secured and the image information before the conversion to the image processing apparatus via the communicating unit.

8. An image forming system according to claim 7, wherein the image forming apparatus further includes: a scanner unit configured to scan image information of an original; and an image forming unit configured to perform image formation on a recording medium on the basis of the image information of the original scanned by the scanner unit, and wherein the control unit converts, concerning image information stored in the recording unit after being scanned by the scanner unit to form an image in the image forming unit, when a request signal for performing processing of the image information is received from the information processing apparatus, a file format by expanding the image information and compressing the image information again using the image processing unit.

9. An image forming system according to claim 7, wherein the image forming apparatus further includes an image forming unit configured to perform image formation on a recording medium on the basis of image information given, and wherein the control unit converts, concerning image information given from another apparatus to form an image in the image forming apparatus, when a request signal for performing processing of the image information is received from the information processing apparatus, a file format by expanding the image information and compressing the image information again using the image processing unit.

10. An image forming system according to claim 7, wherein the image processing unit performs control to convert at least one file format of JPEG and MMR by expanding the image information and compressing the image information again.

11. An image forming system according to claim 7, wherein the control unit determines a file format of the image information and then expands the image information and compresses the image information again on the basis of a result of the determination.

12. An image forming system according to claim 7, wherein the control unit determines a file format of the image information and, if the image information is in at least one file format of JPEG and MMR, does not perform conversion processing.

13. An image forming system according to claim 7, wherein the information processing apparatus further converts, when the image information with the file format converted is received in the image forming apparatus, the image information into at least one file of PDF and TIFF.

14. An image forming method comprising:

in an information processing apparatus and an image forming apparatus provided on a network, the image forming apparatus securing an image processing unit of the image forming apparatus from the information processing apparatus via the network, when a request signal for performing processing of image information is received, if the image processing unit can be secured, converting a file format by expanding the image information and compressing the image information again using the image processing unit secured and transferring the image information converted via the network, and if the image processing unit cannot be secured, transmitting an indication that the image processing unit cannot be secured and the image information before the conversion to the image processing apparatus via the network.

15. An image forming method according to claim 14, wherein, in the image forming apparatus, concerning the image information after being read by a scanner unit built in the image forming apparatus in order to form an image in an image forming unit built in the image forming apparatus, when a request signal for performing processing of the image information is received from the information processing apparatus, a file format is converted by expanding the image information and compressing the image information again using the image processing unit.

16. An image forming method according to claim 14, wherein, in the image forming apparatus, concerning image information given from another apparatus to form an image in an image forming unit built in the image forming apparatus, when a request signal for performing processing of the image information is received from the information processing apparatus, a file format is converted by expanding the image information and compressing the image information again using the image processing unit.

17. An image forming method according to claim 14, wherein the image processing unit performs control to convert at least one file format of JPEG and MMR by expanding the image information and compressing the image information again.

18. An image forming method according to claim 14, wherein, in the image forming apparatus, a file format of the image information is determined and then the image information is expanded and compressed again on the basis of a result of the determination.

19. An image forming method according to claim 14, wherein, in the image forming apparatus, a file format of the image information is determined and, if the image information is in at least one file format of JPEG and MMR, conversion processing is not performed.

20. An image forming method according to claim 14, wherein, in the image forming apparatus, when the image information with the file format converted is received in the image forming apparatus, the image information is further converted into at least one file of PDF and TIFF.

* * * * *